March 26, 1946.    E. H. LAND    2,397,276
LIGHT-POLARIZING IMAGE AND METHOD OF MANUFACTURE
Filed June 21, 1944

INVENTOR.
Edwin H. Land
BY Donald L. Brown
Attorney

Patented Mar. 26, 1946

2,397,276

UNITED STATES PATENT OFFICE 2,397,276

LIGHT-POLARIZING IMAGE AND METHOD OF MANUFACTURE

Edwin H. Land, Cambridge, Mass., assignor to Polaroid Corporation, Cambridge, Mass., a corporation of Delaware Application June 21, 1944, Serial No. 541,430

18 Claims. (Cl. 88—65)

This invention relates to a process for providing in material from the class consisting of the light-transmitting plastics having oriented, chain like molecules, light-polarizing areas which may be employed to form a design most clearly visible in polarized light, and to the product of said process.

This application is a continuation-in-part of my copending application Serial No. 276,233 filed May 27, 1939, for Light polarizing image and process of manufacture.

An important object of the invention is to provide processes for forming in transparent plastic material having substantially uniform molecular orientation, light-polarizing areas which are positively dichroic and which are negatively dichroic as well as to provide processes for forming such areas in overlying relation to each other and in different colors.

Another object of the invention is to provide a process for the formation in a light transmitting plastic material, having substantially uniform molecular orientation such for example as in a sheet of oriented polyvinyl alcohol, regenerated cellulose or polyvinyl acetal, of a plurality of images or designs, the optical density of each of which is a function of the direction of vibration of light incident thereon and the direction of maximum density of each of which is different.

A further object of the invention is to provide a process for the formation, in a sheet or film of transparent plastic having substantially oriented, long chain molecules of a left-eye image and a right-eye image which are formed of light-polarizing parts and parts which are non-polarizing, light incident on the polarizing parts of one image being polarized in a predetermined plane and light incident on a polarizing part of the other image being polarized in a plane at right angles to the first plane.

A still further object of the invention is to provide processes of the character described wherein the sheet is dyed or stained with a dichroic dye or stain which exhibits negative dichroism, then has its molecules oriented and one image formed therein by destroying the dichroism in predetermined parts of the sheet after which predetermined parts of the sheet are dyed or stained with a dye or stain which exhibits positive dichroism to form a second image in the sheet; wherein the sheet is prepared for the formation therein of a plurality of images by substantially orienting the molecules of the sheet and the prepared sheet is treated by staining or dyeing to form first one of the images therein and then the other image, the dye or stain used for the separate images being respectively negatively dichroic and positively dichroic; wherein the sheet is stained by printing thereon from gelatin reliefs, halftone plates, lithograph plates or the like with two different dyes or stains and, wherein the dye or stain forming each image is applied to said sheet so that predetermined areas of the sheet show a predetermined optical density when viewed in polarized light, and other areas thereof show a different predetermined optical density when so viewed, the composite of said areas forming one of a plurality of predetermined designs or images.

Yet a further object of the invention is to provide as a new article of manufacture, transparent plastic material having substantially uniform molecular orientation provided with entirely positively dichroic and entirely negatively dichroic light-polarizing areas which may be in overlying relation to each other and in different colors; to provide such material in the form of an image bearing sheet or film; to provide such a sheet or film which has been stained or dyed so as to show a plurality of predetermined images the optical density of each of which is a function of the direction of vibration of light incident thereon; to provide in a single sheet of transparent plastic, a stereoscopic pair of images, each of which has parts which are dichroic and parts which are non-polarizing; to provide in a single sheet of transparent plastic, images rendered in percentage of polarization; to provide such a sheet of polyvinyl alcohol; to provide such a sheet treated with a dye or stain which exhibits positive dichroism and a dye or stain which exhibits negative dichroism; and to provide such a sheet in which the images are produced from gelatin reliefs or from halftone plates, lithograph plates or the like.

Other objects of the invention will in part be obvious and will in part appear hereinafter.

The invention accordingly comprises the several steps and relation of one or more of such steps with respect to each of the others and the article possessing the features, properties, and the relation of elements which are exemplified in the following detailed disclosure, and the scope of the application of which will be indicated in the claims.

For the fuller understanding of the nature and objects of the invention, reference should be had to the following detailed description, taken in connection with the accompanying drawing in which.

Figure 1:
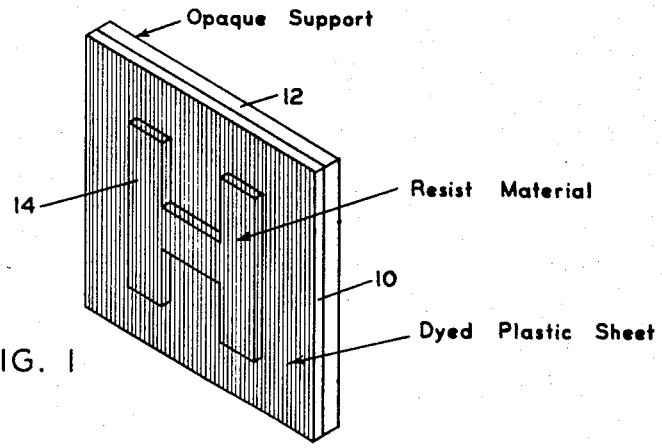
Figure 1 is a diagrammatic view in perspective showing a dyed or stained transparent plastic sheet which is mounted on a support and which has an image formed of a resist material located on the face of the sheet.

As suggested by the objects, the invention is adapted to a variety of uses. It may be employed in the production of light-polarizing images and designs. Likewise it is useful for polarizing predetermined components of light of predetermined colors and for forming the eyeglass lenses and the filters set forth in Patents Nos. 2,298,058 and 2,298,059 issued to me on October 6, 1942, for Light-polarizing device and for Color correction filter employing light-polarizing material, respectively, and Patents Nos. 2,263,684 and 2,291,347 issued on November 25, 1941, and July 28, 1942, respectively, to W. H. Ryan for Polarizing safe light and for Light filter, respectively. The fact that the invention is useful for polarizing predetermined components of light of predetermined colors makes it adaptable to multi-color reproduction of images in accordance with the principles advanced by my Patent No. 2,289,714, issued July 14, 1942, for Light-polarizing image in full color.

Explanation of the present invention may be had by consideration of the formation of polarizing images and designs. These may be formed in previously non-polarizing transparent plastic material by directly dyeing or staining the prepared material with dichroic substances of opposite sign (that is substances exhibiting negative and positive dichroism) in the form of the images or designs. This direct procedure may be combined with the practice of first dyeing or staining the material with one of the dyes or stains, then orienting the molecules of the material and then destroying the dichroism in parts of the material to leave dyed or stained portions in the form of one of the images or designs, after which another image or design is formed on the sheet by directly dyeing or staining it with a dichroic substance. The predetermined images or designs formed in the material each show different optical densities or different degrees of contrast between the light and dark areas thereof in polarized light, said differing optical densities of each design being a function of the vibration direction of light incident thereon.

It will be appreciated that the principles just outlined are readily adaptable to other uses. For example, in producing spectacle lenses or filters such as previously mentioned it is only a question of applying positive and negative dichroic stains or dyes to render a transparent plastic material light-polarizing in character. Similarly in multicolor work, the foregoing principles are adapted to the reproduction of the desired image by the use of several negatively dichroic and positively dichroic dyes or stains, each employed to form a differently colored image.

In the practice of the present invention, a sheet or film of a light-transmitting, preferably transparent plastic, having long chain molecules which have been substantially oriented, is preferably employed. Such a film may comprise any of a variety of plastic materials, such for example as regenerated cellulose, or vinyl compounds, such for example as incomplete polymerized polyvinyl acetal, or preferably polyvinyl alcohol. Orientation of the long molecules of the sheet or film may have been effected by subjecting the sheet to an extension or stretch while heated or otherwise softened. Polyvinyl alcohol, for example, may be suitably stretched or extended after it has been heated, while regenerated cellulose may be similarly suitably extended or stretched after it has been subjected to a swelling agent.

A preferred material for use in connection with the present invention as a sheet or film to be treated is accordingly a transparent plastic having long chain molecules which are oriented to substantial parallelism, and more specifically a sheet of polyvinyl alcohol so prepared.

It is to be understood that the degree of orientation of the molecules of the plastic sheet or film is subject to variation in the practice of the present invention. Where the product of the present invention is to be employed as a stereoscopic image consisting of fusable left-eye and right-eye images, it is desirable that the orientation of the molecules within the plastic sheet be substantially complete. Where the product of the present invention is to be otherwise employed, for example in advertising displays, as images to be viewed in polarized light, such high degree of orientation is not essential. As the orientation of the molecules departs from substantial parallelism, the images formed in the sheet become more and more visible in polarized light vibrating substantially at right angles to the direction of vibration of light in which the image shows the most contrast.

In my copending application Serial No. 237,783, filed October 29, 1938, for Light polarizer and process of manufacture, there are described methods of forming polarizing sheets or films of materials such as those described, as by dyeing or staining the sheets or films, and at some stage in the process, orienting the molecules of the sheets or films. In the practice of the present invention, images, designs, indicia and the like which are visible in polarized light may be formed in a single sheet or film by applying to it, over predetermined areas, suitable negatively dichroic and positively dichroic dyes or stains, so that predetermined areas of the sheet or film are rendered predeterminedly polarizing and of desired sign, the sizes and positions of the areas and the quantities of dye or stain applied thereto being predeterminedly controlled so that the areas form in polarized light a plurality of designs each of which is an exact reproduction of the image, design, or indicium which it intended to reproduce.

As is well known, a dichroic substance has a light absorption axis and a light transmission axis, the two axes being arranged at right angles to each other. Unpolarized light incident on such a substance will have a transmitted component and an absorbed component. The transmitted component will be polarized in the plane of the transmission axis, which as indicated is located at 90° to the absorption axis. The absorption axis of certain dichroic materials is located at an angle of 90° with respect to the absorption axis of certain other dichroic materials. This difference in the positioning of the absorption axes causes a dichroic substance to be designated as positively dichroic or negatively dichroic in accordance with the location of its absorption axis, or in other words positive and negative dichroic substances have their absorption axes mutually perpendicular.

Assuming that transparent plastic material is dyed or stained with a stain or dye of the kind hereinafter described, determination of whether the dye renders the sheet positively or negatively dichroic may be ascertained by density measurements made in plane polarized light. The consideration of these measurements will lead to an understanding of the meaning of the terms positively dichroic and negatively dichroic. The density of the stain or dye is first measured in polarized light with the orientation direction of the molecules of the plastic material parallel to the electric vector (vibration direction) of the polarized light source. This measurement is called $d$-parallel (written $d\|$). A second measurement of density is made in polarized light but with the direction of the molecules of the plastic material perpendicular to the electric vector. This is termed $d$-perpendicular (written $d\perp$). To compare the merits of positively dichroic and negatively dichroic dyes, it is convenient to always take the density ratio as greater than one. Thus, if the ratio $d\|/d\perp$ is greater than one, the polarizer is given a plus sign and is called positively dichroic. On the other hand if the ratio $d\perp/d\|$ is greater than one the polarizer is given a negative sign and is called negatively dichroic.

Certain dyes or stains exhibit positive dichroism and other dyes or stains exhibit negative dichroism. The present invention proposes to incorporate one of these dyes in a sheet of transparent plastic having long chain molecules to form, in the sheet, predetermined light polarizing areas which absorb light vibrating in a direction parallel to the direction of orientation of the molecules of the sheet and also to incorporate a dichroic dye in the sheet as to form light-polarizing areas which absorb vibrations perpendicular to the direction of orientation of the molecules of the sheet. By selecting dichroic dyes or stains of opposite sign, it is possible to form two separate images in a single sheet of a transparent plastic, one of them transmitting light polarized in a predetermined plane and the other transmitting light polarized in a plane at right angles to the transmission plane of the first image.

In one concept, the invention concerns the formation of a plurality of polarizing images in a single sheet of plastic which are of opposite signs. Thus, the invention is particularly useful in providing a stereoscopic print, made up of a left-eye and a right-eye image, both formed in a single sheet and both polarizing light incident thereon but in mutually perpendicular planes.

To effect these purposes, the invention makes use of dichroic dyes or stains which exhibit positive dichroism and also dyes or stains which exhibit negative dichroism. Many dyes which are positively dichroic exhibit their dichroism on absorption onto oriented long, chain molecules. This is also true of some of the dyes or stains which exhibit negative dichroism. However, other dyes or stains which are negatively dichroic, have a tendency to show negative dichroism best when applied to a plastic sheet having unoriented molecules which are oriented after incorporation of the dye or stain in the sheet. Different modes of procedure for forming polarizing images in a single plastic sheet are therefore possible.

In the case of a negative dichroic dye or stain which is useable with oriented plastic, and which is to be employed with a positively dichroic dye or stain, the reproduction of the different dichroic images proceeds by first forming one of the desired images on the sheet with one of the dyes to be used and then forming the second image on the sheet with the other dye which is to be used. It is immaterial whether the first image reproduced is formed with a negatively dichroic or positively dichroic dye or stain so long as the second image is printed with a dye or stain which exhibits dichroism reverse to that of the first dye, or stain. Formation of the images on the plastic sheet with one of the class of dyes or stains just mentioned is accomplished by suitable means which includes printing the images thereon or reproducing them by well known practices employing gelatin wash-off reliefs or photomechanical printing plates.

Preferably, the sheet is mounted on a support before the images are reproduced therein. The support may be transparent or it may be an opaque support having a reflecting surface, such as a metallized paper. The invention is particularly adapted to the making of prints, in which case a reflecting backing is employed. The images may also be formed in an unsupported sheet or their reproduction may be carried out with the sheet mounted upon a temporary support from which it is stripped and subsequently mounted on a permanent support.

After the formation of the two images, it is generally desirable to cover the surface on which they have been reproduced with a protective covering such as a varnish, lacquer, or the like.

A somewhat different procedure, than that heretofore indicated, is followed where there is employed a negatively dichroic dye or stain of the class which is poorly dichroic when incorporated in plastic sheet having oriented molecules. In this instance, the sheet with its molecules in an unoriented condition is dyed with a negatively dichroic dye or stain, as for example, by casting the same in the sheet or by imbibition. The molecules of the sheet are then oriented, the molecules of the dye being simultaneously oriented. Fig. 1 shows a plastic sheet 10 which has been dyed with, for example, a negatively dichroic dye of suitable color as indicated by the vertical lines on the surface of the sheet. The sheet 10 is mounted upon a suitable support 12, preferably opaque as already indicated.

It is now desired to form an image in the sheet 10. Inasmuch as the whole sheet has been dyed it becomes necessary to destroy the dichroism in those portions thereof which are to form the nonpolarizing portions of the image. For this purpose, use is made of a suitable resist material applied to the surface of the sheet to protect those areas thereof which are to form the light-polarizing portions of the image during the destruction of the dichroism of the dye or stain in the adjacent portions. The resist may be applied by hand or by the use of any conventional practice, as for example, by a photomechanical printing plate. In the event that the resist material is of the type which is water soluble and which when dry will form an impenetrable coating, it may be applied by means of a gelatin relief. Fig. 1 also shows a resist 14 in the form of a line drawing applied upon the surface of the sheet 10. This particular design represents the letter "H." Preferably, as shown in Fig. 1, the resist 14 is transparent.

After the reproduction of the image upon the surface of the sheet 10 in the form of a resist, the dyed portions of the sheet adjacent to those covered by the resist have their dichroism destroyed. One manner of accomplishing this is to bleach the dye in those portions of the sheet adjacent the resist 14 by treating the sheet with a suitable bleaching agent, by conventional methods, after which any excess of the bleaching agent is removed by practices well understood by the art. In some instances, depending upon the type of dye employed, it may be necessary to remove the bleached dye itself, in which case the dye may be removed by washing. After destruction of the dichroism in parts of the sheet, the resist material may be removed in any conventional manner, for example, by treating it with a solvent.

Figure 2:
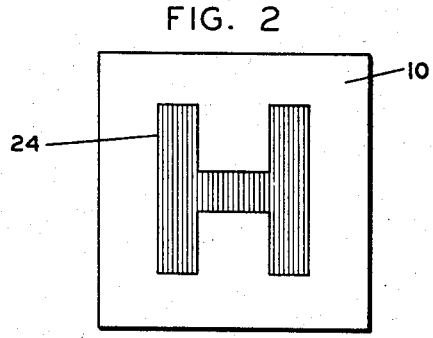
Fig. 2 is a plan view of the plastic sheet showing the image of Fig. 1 reproduced in the sheet to form the dyed or stained portions of the sheet.

The result of these practices may be observed in Fig. 2, wherein the portions forming the design or image are shown at 24 as dyed and polarizing and the remaining portions as non-polarizing and substantially clear. It is important to note that an image formed directly on oriented plastic sheet by a negatively dichroic dye rather than by the practice of incorporating the dye in unoriented sheet, will have an appearance substantially similar to the image shown in Fig. 2. Hence Fig. 2 broadly represents a sheet of transparent plastic on which there has been formed a design having negatively dichroic areas and also non-polarizing areas, irrespective of the manner in which the design has been reproduced.

Reproduction of the second desired image on the sheet 10 is effected by the use of a positively dichroic dye or stain which is applied onto the surface of the sheet 10 over the negatively dichroic image 24. The positively dichroic dye or stain which forms the second image, may be applied in the manner already pointed out, that is for example by painting it on the sheet or by placing it thereon through the use of a wash-off relief or a photomechanical printing plate.

Figure 3:
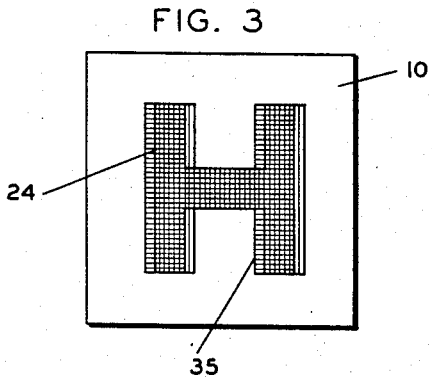
Fig. 3 is a plan view similar to Fig. 2 showing a left and a right-eye image reproduced in the plastic sheet in different dyes or stains to provide a stereoscopic pair.

Fig. 3 shows a transparent plastic sheet 10 having the negatively dichroic image 24 thereon and also a positively dichroic image 35 which is formed with a positively dichroic dye as is indicated by the horizontal lines forming the second image. Preferably similarly colored dyes are employed when the images 24 and 35 form a stereoscopic pair. The two images are superposed with the image 35 being over the image 24. In Fig. 3, the image 24 represents a left-eye image and the image 35 a right-eye image. When viewed without the aid of a stereoscopic viewer, the two images have the appearance shown in Fig. 3. This is due to the fact that images 24 and 35 are not congruent to each other but are taken from different angles and are positioned in a favorable relation for left-eye and right-eye images which can be fused into a stereoscopic image when viewed with a suitable viewer.

An excellent positively dichroic dye or stain for use with the invention is one comprising iodine in combination with an iodide which forms with the iodine a polarizing polyiodide. Suitable iodides for use in the preparation of such a stain are, for example, sodium iodide and ammonium iodide. They are preferably employed with a relatively small amount of iodine. A suitable solution, for example, for staining polyvinyl alcohol, may be formed by preparing a solution of 20 grams of ammonium iodide in 100 c. c. of water, dissolving therein one gram of iodine, and adding thereto a solution of 50 grams of ammonium iodide in 500 c. c. of water. Other quantities of the iodide may be used. By altering the quantity of the iodide employed, predetermined changes in the extinction color of the image formed may be obtained. Stains produced from solutions of iodine and iodides are herein described as stains formed by polarizing polyiodides.

It is to be understood that many other positively dichroic dyes or stains may be used, for example, the dyes mentioned in my said copending application Serial No. 237,783. Speaking generally, most aniline dyes may be employed for this purpose it being understood however, that many dyes of other classes may also be used. Bromine also may be employed as the positively dichroic material in the process of the invention.

As indicative of suitable positively dichroic dyes, which incidentally can be used in providing the color components in a multi-color image, mention is made of Solantine Red 8BL; Solantine Pink 4BL; a dye formed by coupling tetrazotized dianisidine with resorcinol; Erie Yellow Y; Stilbene Yellow; a dye formed by coupling tetrazotized dianisidine with phenol; Pontamine Sky Blue 6BX greenish; Pontamine Fast Green 5BL; a dye formed by coupling tetrazotized dianisidine with S acid (1-amino-8-naphthol-5-sulphonic acid); Erie Black GXOO; and Amanil Black WD.

Examples of negatively dichroic dyes or stains include Alizarine Red S; Brilliant Indigo B; Vat Printing Black GR; Indanthren Red Violet RHA; Calcoloid Violet GRD; Indanthren 3 Brilliant Orange RKA; Calcoloid Yellow 5GD; Calcoloid Golden Orange GD; Ponsol Violet AR; and Amanthrene Yellow G.

The last two dyes named in the foregoing list display negative dichroism when incorporated in plastic sheet which has its molecules oriented. The other negatively dichroic dyes on the list are best employed by introducing them into plastic sheet the molecules of which are in an unoriented condition.

With the exception of Alizarine Red S, all of the named negatively dichroic dyes are vat dyes. As is well known, vat dyes are water insoluble. However, these dyes in their reduced or leuco form are rendered water soluble and are used by the invention in this form. After application in water soluble form to a material to be dyed, a vat dye quickly reoxides in air to its original color. Hence, in destroying the dichroism of a vat dye not only must the color of the dye be bleached but the dye must either be retained in a colorless condition or removed from the plastic sheet. This may be accomplished by removing the bleached dye or converting the dye to and fixing it in a colorless condition by washing with a suitable reagent or by other treatment understood by the art.

Suitable resist or masking materials include non-permeable "ink," such as printer's ink, preferably transparent. Also wax, lacquer or varnish may be employed, this being applied in a sufficiently thin layer so that it is substantially transparent.

Alkaline sodium hydrosulphite provides a suitable bleaching or reducing agent for all of the vat dyes named herein. Bleaching agents for other dyes disclosed include sodium hypochlorite, sodium hydroxide, ammonium hydroxide, or sodium thiosulphate.

While the prints formed by the practice of the invention have been described as preferably mounted upon an opaque backing, it is to be understood that the invention contemplates the use of the prints in the form of transparencies. Where such is the case, a transparent backing member such as cellulose acetate may be substituted for the opaque backing or the image bearing sheet may be mounted between two transparent plastic supports formed of cellulose acetate. In regard to transparencies it is to be noted that the invention is not limited to the production of prints but may be employed to produce moving picture films of the character having a plurality of superposed images formed therein.

Under certain circumstances and for example where polyvinyl alcohol is employed and it is intended to use dyes or stains which may be absorbed thereby without loss of dichroism after the molecules of the sheet are oriented, the sheet or film in which the designs are formed may be somewhat further hardened, after its molecules have been substantially oriented and before the images are formed therein. This may be accomplished by heating the sheet after it has been stretched and while maintaining it in stretched condition. A sheet so treated shows less water permeability and greater heat stability than an untreated sheet.

It is further to be understood that in the formation of any one of the polarizing designs reproduced in a plastic sheet, the use of different stains or dyes or different concentrations of the same stain or dye, may be employed in the reproduction of each polarizing image to show different extinction colors and varying degrees of contrast, even though the particular image be produced from the same plate relief or other means. All such modifications of the process are to be deemed within the scope of the invention.

The terms, "dye" and "stain" as used in the specifications and claims is intended to include any material which when applied to or incorporated in an article causes a visible change in the color of the article or in the optical density of the article.

The term, "image" in the specifications and appended claims is intended to be generic and to include among other things a design, image, picture, indicium, mark, token, print etc., whether as a positive or a negative.

Since certain changes in carrying out the above process may be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A process of providing a pair of images in a transparent plastic material of substantially uniform molecular orientation throughout, comprising forming one of said images in said material in the form of negatively dichroic light-polarizing areas and forming the other of said images in the material in the form of positively dichroic light-polarizing areas, the optical density of each of said areas in each image being a function of the vibration direction of light incident thereon.

2. A process of providing a predetermined stereoscopic left and a right-eye image in a transparent plastic material of substantially uniform molecular orientation throughout, comprising forming one of said images in said material in the form of negatively dichroic light-polarizing areas and forming the other of said images in the material in the form of positively dichroic light-polarizing areas which are located with respect to the negatively dichroic areas in favorable positions for fusion with the negatively dichroic areas to provide a stereoscopic image, the optical density of each of said areas in each image being a function of the vibration direction of light incident thereon.

3. The process comprising forming a transparent plastic sheet having long chain molecules, rendering said molecules substantially parallel throughout the sheet and forming in said sheet negatively dichroic light-polarizing areas and positively dichroic light-polarizing areas, said negatively dichroic areas forming in said sheet a predetermined image and said positively dichroic areas forming in said sheet a second predetermined image, the optical density of each of said areas in each image being a function of the vibration direction of light incident thereon.

4. A process of forming a pair of images in a single sheet of transparent plastic material of substantially uniform molecular orientation, comprising forming one of said images in said sheet by rendering predetermined portions of the sheet light-polarizing with a negatively dichroic dye, and forming the other of said images in the sheet by rendering predetermined portions of the sheet light-polarizing with a positively dichroic dye, the optical density of each of said portions in each image being a function of the vibration direction of light incident thereon.

5. A process of forming a pair of images in a single sheet of transparent plastic material having substantially uniformly oriented, long chain molecules, comprising forming one of said images in said sheet by rendering predetermined portions of the sheet light-polarizing by incorporating therein varying amounts of a negatively dichroic dye, and forming the other of said images in the sheet by rendering predetermined portions of the sheet light-polarizing by incorporating therein varying amounts of a positively dichroic dye, the optical density of each of said areas in each image being a function of the vibration direction of light incident thereon.

6. A process of forming a pair of images in a single sheet of transparent plastic material having long chain molecules, comprising dyeing the sheet with a negatively dichroic substance, orienting the molecules in said sheet substantially uniformly, transforming predetermined portions in the sheet to non-polarizing areas while retaining predetermined portions of the sheet in a negatively dichroic condition to provide negatively dichroic light-polarizing areas and then converting predetermined portions of the sheet to positively dichroic light-polarizing areas by dyeing with a positively dichroic substance, said negatively dichroic areas forming in said sheet a predetermined image and said positively dichroic areas forming in said sheet a second predetermined image, the optical density of each of said areas in each image being a function of the vibration direction of light incident thereon.

7. The process of forming a pair of images in a single sheet of transparent plastic material having long chain molecules, comprising dyeing said sheet with a negatively dichroic dye, orienting the molecules of said sheet substantially uniformly, transforming predetermined portions of the dyed sheet to non-polarizing areas by destroying the dichroism of the negatively dichroic dye in said areas while retaining other predetermined portions of the sheet negatively dichroic to form light-polarizing areas, and then converting predetermined portions of the sheet to positively dichroic areas by dyeing said portions with a positively dichroic dye, said negatively dichroic areas forming in said sheet a predetermined image and said positively dichroic areas forming in said sheet a second predetermined image, the optical density of each of said areas in each image being a function of the vibration direction of light incident thereon.

8. A process for providing a predetermined left-eye image and a predetermined right-eye image in a single sheet of transparent plastic material having long chain molecules, comprising dyeing the sheet with a negatively dichroic dye, orienting the molecules of the sheet substantially uniformly, forming one of said images in said sheet by transforming predetermined portions of the sheet into a non-polarizing condition to provide non-polarizing areas while retaining predetermined portions of the sheet dichroic to provide negatively dichroic light-polarizing areas, and then forming the other of said images in the sheet by dyeing with a positively dichroic dye predetermined portions of the sheet to provide positively dichroic light-polarizing areas located with respect to said negatively dichroic light-polarizing areas in positions favorable for fusion therewith to provide a stereoscopic image, the optical density of each of said areas in each image being a function of the vibration direction of light incident thereon.

9. The process comprising, forming a transparent plastic sheet having long chain molecules, orienting the molecules of said sheet substantially in parallelism, incorporating in predetermined portions of the oriented sheet a positively dichroic substance and a negatively dichroic substance to provide positively dichroic and negatively dichroic light-polarizing areas therein, said negatively dichroic areas forming in said sheet a predetermined image and said positively dichroic areas forming in said sheet a second predetermined image, the optical density of each of said areas in each image being a function of the vibration direction of light incident thereon.

10. A process of providing a predetermined left-eye image and a predetermined right-eye image in a transparent plastic sheet having long chain molecules, comprising orienting the molecules of said sheet in substantially a uniform direction, incorporating a positively dichroic dye and a negatively dichroic dye in predetermined portions thereof to provide in the sheet positively dichroic and negatively dichroic light-polarizing areas, said negatively dichroic areas forming in said sheet a predetermined image and said positively dichroic areas forming in said sheet a second predetermined image, said images being located with respect to each other in positions which are favorable for fusion to provide a stereoscopic image, the optical density of each of said areas in each image being a function of the vibration direction of light incident thereon.

11. Transparent plastic material having substantially uniformly oriented, long chain molecules, predetermined portions only of said material being dyed with a dye which renders said portions negatively dichroic and predetermined portions only of said material being dyed with a dye which renders said portions positively dichroic, said negatively dichroic portions and said positively dichroic portions respectively forming in polarized light two separate images, the optical density of each of which is a function of the vibration direction of said polarized light.

12. A single sheet of a transparent plastic having substantially uniformly oriented, long chain molecules, predetermined portions only of said sheet being dyed with a dye which renders said portions negatively dichroic, and predetermined portions only of said sheet being dyed with a dye which renders said portions positively dichroic, said negatively dichroic and said positively dichroic portions each forming respectively one of a stereoscopic pair of images and being arranged in a relation to each other which favors fusion, the optical density of each separate image being a function of the direction of vibration of said polarized light.

13. As a new product, a sheet of polyvinyl alcohol of substantially uniform molecular orientation having predetermined portions only thereof dyed with a dye which renders said portions negatively dichroic, and predetermined portions only thereof dyed with a dye which renders said portions positively dichroic, said negatively dichroic portions and said positively dichroic portions respectively forming in polarized light two separate images, the optical density of each of which is a function of the vibration direction of said polarized light.

14. As a new product, a transparent plastic sheet having substantially uniformly oriented, long chain molecules, predetermined areas of said sheet having varying amounts of a negatively dichroic dye incorporated therein, said areas forming in combination a predetermined image, and predetermined areas of said sheet having varying amounts of a positively dichroic dye incorporated therein, said positively dichroic areas forming in combination a second predetermined image.

15. The process of forming light-polarizing images in unitary, transparent plastic material having the molecules thereof oriented in substantially a common direction, comprising predeterminedly forming in the material light-polarizing portions which are negatively dichroic and which are positively dichroic, said negatively dichroic portions together forming a predetermined image which is light-polarizing and said positively dichroic portions together forming another predetermined image which is light-polarizing and which has polarizing characteristics opposite to those of the first named image.

16. The process of forming light-polarizing images in a transparent plastic material having the molecules thereof oriented substantially in parallelism, comprising predeterminedly forming in the material differently colored light-polarizing portions which overlie each other and which are negatively dichroic and which are positively dichroic, said negatively dichroic portions together forming a predetermined light-polarizing image in color and said positively dichroic portions together forming another predetermined color image which is light-polarizing.

17. As a new product, a unitary transparent plastic material having substantially uniformly oriented, long-chain molecules and containing in predetermined portions thereof a negatively dichroic substance of a predetermined color and in other predetermined portions thereof a positively dichroic substance of a different color, said portions containing the negatively dichroic substance together providing a negatively dichroic light-polarizing image in color and said portions containing the positively dichroic substance together providing a positively dichroic light-polarizing image in a different color.

18. As a new product, a transparent plastic material having molecules which are oriented substantially in parallelism, said oriented material having predetermined portions thereof containing a negatively dichroic substance and other predetermined portions thereof containing a positively dichroic substance, the portions containing the negatively dichroic substance together forming a negatively dichroic light-polarizing image and the portions containing the positively dichroic substance together forming a positively dichroic light-polarizing image, said portions containing one dichroic substance being in overlying relation to the portions containing the other dichroic substance.

EDWIN H. LAND.